:::::: {.columns}
::: {.col}
3,850,855
PHOTOLYTIC POLYISOBUTYLENE OXIDE RESIN MOLDED PRODUCTS OF VANISHING TYPE
Hirotaka Toba, Tokyo, and Kazunobu Tanaka, Masahiko Kusumoto, Shoji Watanabe, and Nagayoshi Tsukane, Saitama, Japan, assignors to Daicel Ltd., Osaka, Japan
Filed Mar 9, 1973, Ser. No. 339,852
Claims priority, application Japan, Mar. 14, 1972
47/25,903
Int. Cl. C08g 23/06
U.S. Cl. 260—2 A                     13 Claims

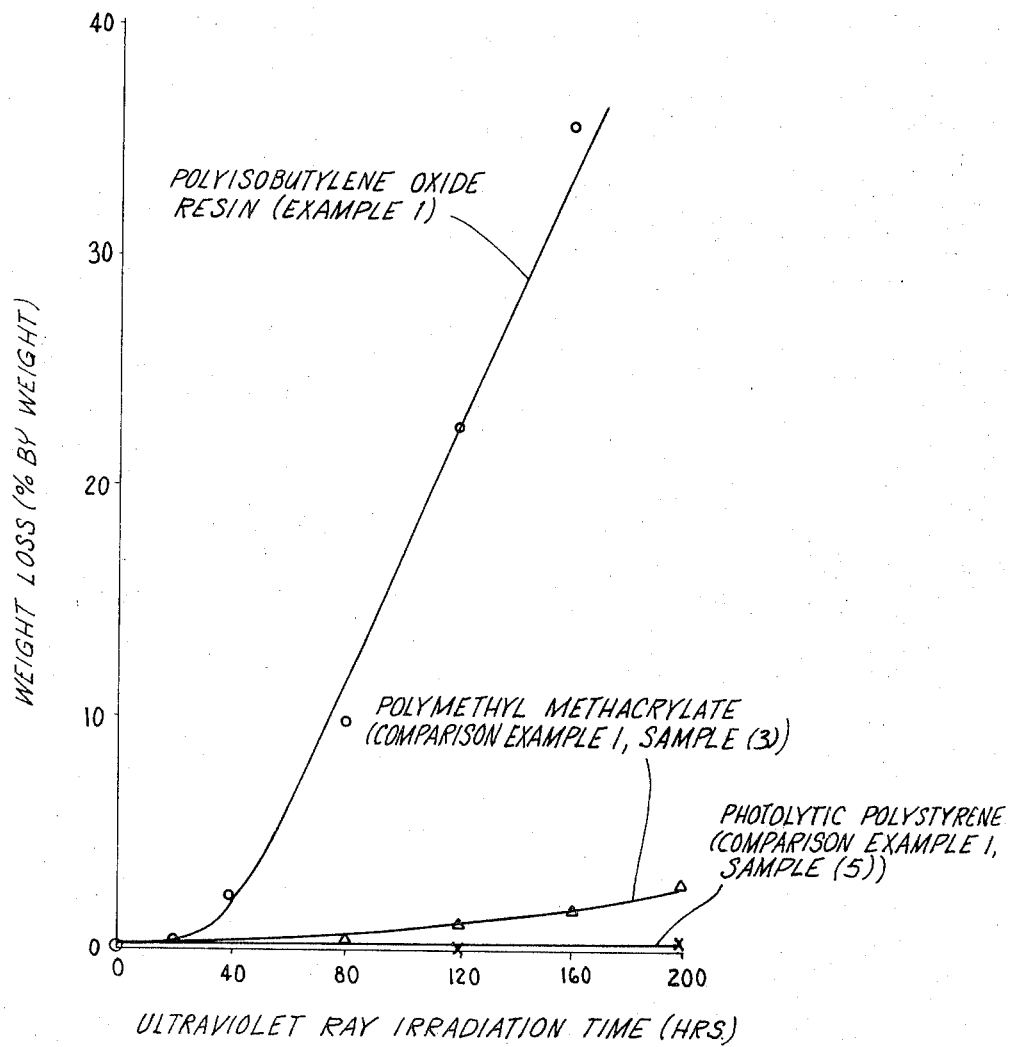

ABSTRACT OF THE DISCLOSURE

Polyisobutylene oxide resin compositions are described which disintegrate under natural or artificial atmospheric conditions of light into powder and eventually into volatile organic materials. These photolytic properties are induced by the presence of a photosensitizer or a photo sensitive resin.

BACKGROUND OF THE INVENTION

Field of the Invention

This invention relates to resin molded products which disintegrate over a period of time by exposure to light.

Description of the Prior Art

Various resin molded products comprising mainly synthetic high molecular weight substances and having a high durability and heat resistance have geen investigated and developed and their production has been increased remarkably in many countries of the world, especially in U.S.A., European countries and Japan.

However, unlike natural high molecular weight substances, synthetic resin molded products are not readily decomposed by weathering after they have been discarded and they retain their original shapes permanently, more or less. Therefore, they are a source of environmental pollution, and they give rise to many related troubles.

Further, if city garbage containing synthetic high molecular weight substances is incinerated, the furnace is damaged by the high calorific value thereof and also by the generation of corrosive gases. Thus, the treatment of waste synthetic high molecular substances is now posing a serious social environmental problem.

For solving this problem, various attempts have been made such as practical utilization of a special incinerator, regeneration and reuse of discarded synthetic high molecular weight substances and recycle of the waste as raw material after a thermal decomposition treatment. However, those attempts involve many problems which cannot be solved easily such as economic problems, sorting of the synthetic high molecular substances from the waste and the countermeasures for unrecoverable waste synthetic high molecular substances such as those dumped into the sea or in land fills.

For solving those problems, the utilization of photolytic polymers and water-soluble polymers has been proposed. As the photolytic polymers, there can be mentioned, for example, copolymers of ethylene and carbon monoxide, copolymers containing vinylketone comonomers and polyolefin or polystyrene resins imparted with a photolytic property by incorporating therein an additive such as a sensitizer. It is said that in the ethylene-
:::
::: {.col}
carbon monoxide copolymers and copolymers containing vinylketone comonomers, scission reaction of the main chain of the polymers is caused due to a sensitizing effect of the carbonyl group in the polymer and that in the above polyolefin and polystyrene resins the additive reacts as a radical with the main chain of the polymers due to its sensitizing effect or the energy of light absorbed by the additive is propagated to the polymers to accelerate scission of the main chain of the polymers. However, disintegration into powder of those polymers requires a quite long period of time. Further, it is considered that, though the prior water-soluble polymers lose their original shapes by dissolving them in water, they are not decomposed completely, thereby causing a secondary nuisance. Thus, the problems cannot be solved effectively by those methods.

It has been well known that a chain scission reaction is carried by light energy in high molelular weight substances, such as a polyacetal resin or polymethyl methacrylate resin, whereby they are reduced in weight gradually. However, those deterioration properties are still insufficient to effect rapid decomposition and disappearance of the wastes through deterioration by light.

Waste natural high molecular weight substances such as woods, papers and natural fibers are decomposed and weathered away by subterranean bacteria, light, water, air and wind. They start to decay after about half a month. They lose their original shape and they vanish and return to dust after several years. However, synthetic high molecular weight substances either (1) are not decomposed or (2) they do not vanish completely.

From various viewpoints, there have been desired syntheic high molecular weight substances which are practically stable during use but thereafter decompose due to the actions of light, oxygen and microorganisms and return to dust via the path of materials through the organism-natural environment cycle. However, the development of a technique of imparting such a property to synthetic high molecular weight substances has been considered to be very difficult and there has been not any clear solution up to now.

BRIEF DESCRIPTION OF THE INVENTION

The present invention relates to resin molded products which are stable during their normal use, but which thereafter decompose and deteriorate rapidly into volatile organic materials through an intermediate powdery state, under the effects of natural conditions such as sunlight or mercury lamp or by artificial photoenergy. More particularly, the invention relates to photolytic polyisobutylene oxide resin molded products of the vanishing type which cause no environmental pollution, characterized in that the starting molded compositions comprising polyisobutylene oxide resin contain a photo-sensitizer so that the weight loss of the molded products will be 5–50 wt. percent per 1 mm. thickness when the molded products are irradiated with a 200 watt high pressure mercury lamp at a distance of 5 cm. at 40° C. for 120 hours in air.

The inventors have discovered novel photolytic compositions which decompose not only into powders but further into volatile organic matter and which finally vanish.

The inventors' findings are as follows: Polyisobutylene oxides are very stable and they have a high practical value
:::
::::::

as starting material for the molding of products of various shapes, including sheets, films and fibers. However, it has been discovered that if products prepared from polyisobutylene oxide resin compositions comprising polyisobutylene oxide and a proper quantity of a photosensitizer are exposed to sunlight, ultraviolet rays or light of carbon arc lamp, they absorb light energy and after a certain induction period, the main chain of the polyisobutylene oxide polymer is cut to cause reduction in the polymerization degree. Consequently, a remarkable weight loss occurs. Finally,, the polyisobutylene products vanish into the environment, since they are converted to liquid and gaseous substances under ordinary natural conditions.

By precise examination of the decomposition products, various oxygen-containing compounds were detected such as formic acid, acetic acid, propionic acid, isobutyl alcohol, isobutyl aldehyde, acetone, carbon dioxide and water.

The complete mechanism of the formation of those compounds is not known. It is supposed that a hydroperoxy radical is formed by the photooxidation reaction of the polyisobutylene oxide polymer and thereby cutting the main chain, or that the carbon-oxygen bond in the main chain is cut by light energy to form an active radical, and products of this scission reaction such as isobutyl aldehyde and isobutyric acid are further subjected to the photo-oxidation reaction. In either case, the decomposition products enter in the cycle of organism-environment such as the "tricarboxylic acid cycle" under natural conditions or the products are further decomposed by the actions of light, air and bacteria into carbon dioxide, water, etc. and returned to dust in the natural world. Thus, by using resin molded products prepared from said compositions, the problem of public nuisance of general synthetic high molecular substances can be solved completely.

Further, it has been found that, if the polyisobutylene oxide resin molded products are kept from exposure to light including ultraviolet rays by, for example, placing them in a closed room, their stability is maintained semi-permanently and they can be used practically as quite useful molded products without exhibition of their photolytic property.

On the basis of the above findings, the inventors have made intensive investigations of techniques of improving the essential properties of polyisobutylene oxides and imparting to them the same decompovsing property as that of the natural high molecular weight substances.

The photolytic property of polyisobutylene oxide resins can be controlled according to various techniques so that the weight loss per 1 mm. thickness of the molded product thereof will be, for example, about 0–70 wt. percent when the molded products are irradiated with a 200 watt high pressure mercury lamp at a distance of 5 cm. at 40° C. for 120 hours in air. However, if the weight loss is higher than 50 wt. percent, the practical value of the resin is lowered, because the thermal stability of the product during the molding procedure is reduced, or deterioration starts during use when the products is exposed to a weak light continuously in a room.

Precise comparative investigations were made on the physical properties, particularly the change in tensile strength, elongation and weight loss, of polyisobutylene oxide resins and other comparative resins by irradiation with a high pressure mercury lamp, irradiation with a carbon arc lamp by using a weather-ometer and outdoor exposing test in the suburbs of Tokyo, Japan (171, Oaza-Tsurugaoka, Oi-machi, Iruma-gun, Saitama-ken) under said conditions. By these technical investigation, the inventors have determined the relationship between the irradiation with the high pressure mercury lamp, irradiation with the carbon arc lamp by using weather-ometer and the outdoor exposing test under said conditions, with respect to the photolytic property. For example, the following weight losses were noted in said three exposing tests of pressed sheets (1 mm. thickness) prepared from a composition comprising 100 parts by weight of polyisobutylene oxide powder, 0.9 part by weight of tetrakis [methylene-3-(3,5-di-t-butyl-4-hydroxy - phenyl)propionate] methane and 0.1 part by weight of benzyldisulfide as antioxidants, 0.1 part by weight of anthraquinone as photosensitizer and 0.2 part by weight of 2-(2'-hydroxy-5'-methylphenyl) benzotriazole as ultraviolet ray absorber.

TABLE 1
[Difference in photolytic property of polyisobutylene oxide molded products according to method of irradiation]

| Outdoor exposing test | | Carbon arc lamp irradiation with weather-ometer (30° C.) | | 200 watt high pressure mercury lamp irradiation (40° C.) | |
|---|---|---|---|---|---|
| Exposing period | Weight loss (percent) | Irradiation time (hr.) | Weight loss (percent) | Irradiation time (hr.) | Weight loss (percent) |
| From July to the end of Sept., 1970 (3 months) | 3.5 | 80 | 4.1 | 60 | 3.7 |
| From July to the end of Dec., 1970 (6 months) | 9.9 | 160 | 10.8 | 120 | 10.1 |
| From July, 1970 to the end of March, 1971 (9 months) | 18.2 | 240 | 19.7 | 180 | 19.1 |
| From July, 1970 to the end of June, 1971 (one year) | 23.8 | 320 | 26.5 | 240 | 25.4 |

The results shown in Table 1 suggest that the irradiation with the 200 watt high pressure mercury lamp at a distance of 5 cm. at 40° C. for 120 hours in air corresponds to about 6 months' outdoor exposing test under the same conditions. Of course, the relationship between them cannot be determined exactly, since it differs with locality and weather conditions. However, the method of irradiation with high pressure mercury lamp under said conditions is a reasonable, practical technical means of measuring the photolytic property.

The inventors have obtained the following experimental results with respect to the relation of photolytic property and thickness of the molded sheet of polyisobutylene oxide. Experiments were made wherein pressed sheets of various thicknesses were prepared from the polyisobutylene oxide composition, and their weight loss due to the irradiation with a high pressure mercury lamp were measured under said conditions. In one experiment, an air stream passing above the sample was controlled to a small velocity so as not to blow away the powdery product on the surface of the sample which powdery product had been produced by the photolysis of the sample. In another experiment, the velocity of the air stream was elevated intermittently so as to blow away the powdery product on the surface of the sample, but to keep the powder within the experimental vessel, thereby exposing fresh surface of the sample. The sample was exposed to ultraviolet rays in both experiments to obtain the results as shown in Table 2.

It may be easily understood that the conditions in the latter experiment are artificial conditions designed to simulate the natural conditions under which fresh surface of the sample is continually exposed by wind and rain.

TABLE 2

[Relationship between thickness and photolytic property* of polyisobutylene oxide molded sheets]

| Thickness of molded sheets | 0.3 mm. | 0.5 mm. | 1.0 mm. | 2.0 mm. | 5.0 mm. |
|---|---|---|---|---|---|
| Weight loss in case of no fresh surface exposure (percent) | 35.7 | 20.9 | 10.8 | 4.4 | 1.5 |
| Weight loss in case of fresh surface exposure (percent) | 35.9 | 20.4 | 10.8 | 5.3 | 2.2 |

*Weight loss (weight percent of produced volatile substance) after irradiation with 200 watt high pressure mercury lamp at a distance of 5 cm. at 40° C. for 120 hours in air.

NOTE.—Size of test sample: 10 cm. x 2 cm.

The results of Table 2 suggest that with a thickness of the sample below 1.0 mm., the weight loss due to the photolysis does not depend on the thickness thereof and that with a thickness above 1.0 mm., the efficiency of the photolysis is redused by the powder accumulated on the surface of the sample, because the light is intercepted by the powder and transmission of the light into the sample is interfered with, unless fresh surface is continually exposed. Such a phenomenon has been confirmed empirically with various polyisobutylene oxide resin molded products. The experimental results indicate that the most reasonable standard of measurement of the photolytic property in the present invention is the weight loss of a molded product of 1 mm. thickness, caused by the irradiation from a 200 watt high pressure mercury lamp at a distance of 5 cm. at 40° C. in air.

The present invention has been accomplished on the basis of the above findings and experimental results. More particularly, the invention has been accomplished on the basis of the finding that excellent, practical, photolytic polyisobutylene oxide resin molded products of the vanishing type are those, the weight loss of which is 5–50 wt. percent per 1 mm. thickness after irradiation thereof with 200 watt high pressure mercury lamp at a distance of 5 cm. at 40° C. for 120 hours in air. Those excellent polyisobutylene oxide resin molded products are stable during the molding operation and also during use or storage under such conditions that they are exposed only to weak ultraviolet rays or are protected from exposure to such light in a chamber. The molded products are decomposed and deteriorated rapidly under natural conditions involving ultraviolet rays of sunlight or mercury lamp or by an artificial photoenergy and, after they have been discarded, their mechanical strength is reduced and they disintegrate into powder and finally decompose into volatile organic matter. Thus, the molded products vanish or disappear eventually.

The term "vanish" or derivatives thereof as used herein relates to the phenomenon of disintegration of the molded products into powder material and finally to volatile organic matter.

The photolytic property of the polyisobutylene oxide resin molded products of the present invention is induced by incorporating a sensitizer in the starting compositions. The adjustment is effected according to, for example, the following technical methods:

One is a method in which a sensitizer is incorporated in the molding composition. Examples of sensitizers are benzophenone; quinone compounds such as p-benzoquinone, anthraquinone, naphthaquinone and 1,2-benzanthraquinone; nitro compounds such as o-nitrobenzaldehyde and nitronaphthalene; metal acetylacetone chelate compounds such as copper acetylacetone chelate cobalt acetylacetone chelate, nickel acetylactone chelate and manganese acetylacetone chelate;

Another is a method in which said sensitizers are used together with various antioxidants or ultraviolet absorbing agents such as salicylic acid ultraviolet absorbers, for example, phenyl salicylate, 4-tertiary butylphenyl salicylate and p-otylphenyl salicylate; substituted benzophenone ultraviolet absorbers, for example, 2-hydroxy-4-methoxybenzophenone, 2 - hydroxy-4-methoxy-2' - carboxybenzophenone, 5-chloro-2-hydroxybenzophenone and 2,2'-dihydroxy-4,4'-dimethoxybenzophenone; and benzotriazole ultraviolet absorbers, for example, 2-(2'-hydroxy-5'methylphenyl) benzotriazole, 2-(2'-hydroxy-3'-*t*-butyl-5'-methylphenyl)-5-chlorobenzotriazole, and 2 - (2'-hydroxy - 3',5'-di-*t*-butylphenyl)-5-chlorobenzotriazole and antioxidants such as tetrakis [methylene-3-di-*t*-butyl-4-hydroxyphenyl propionate] methane and 4,4'-butylidene-bis (3-methyl-6-*t*-butylphenol);

Another is a method in which a photosensitive resin such as polyvinyl cinnamate or polycinnamylidene acetate is blended with the composition as photosensitizer; and A method in which the above respective additives are used together.

The above technical method will be illustrated below by way of an example. A combination of anthraquinone as sensitizer and 2-hydroxy-4-methoxybenzophenone as ultraviolet absorber was added to a polyisobutylene oxide resin. From the mixture, a sheet of 1 mm. thickness was molded. Photolytic property and the practical effect of the molded product were as shown in Table 3.

The photolytic property of the polyisopropylene oxide resin molded product varies depending upon the sensitizer and ultraviolet absorber added. Therefore, it is not possible technically to define generally the relationship between the photolytic property and quantity of the additives. It is more paractical to evaluate the photolytic property according to quantity of light of irradiation.

TABLE 3

Method of induction of photolytic property of polyisobutylene oxide resin molded product

| Anthraquinone/2-hydroxy-4-methoxy benzophenone in 100 parts by wt. of polyisobutylene oxide (parts by wt.) | Reduced viscosity of molded product* (g./dl.) | Tensile strength at breaking point (kg./cm.²) | After irradiation with 200 watt high pressure mercury lamp for 120 hrs.** | |
|---|---|---|---|---|
| | | | Tensile strength at breaking point (kg./cm.²) | Weight loss (percent) |
| 0/0.5 | 3.20 | 474.2 | 458.0 | 0 |
| 0.1/0.3 | 2.81 | 456.7 | 233.5 | 19.6 |
| 0.3/0.3 | 2.44 | 436.1 | 198.6 | 31.1 |
| 0.5/0 | 0.82 | 210.5 | | 68.2 |

*Measured in o-dichlorobenzene at 110° C.
**In air, 40° C., 5 cm. distance.

However, the photosensitizers, ultraviolet absorbers and antioxidants are used in amounts of 0–5 parts by weight based on 100 parts by weight of the polyisobutylene oxide resin, respectively.

The polyisobutylene oxide resins of the invention include, in addition to polyisobutylene oxide resin per se, compositions comprising copolymers of isobutylene oxide with alkylene oxides of 2–5 carbon atoms, such as 1-butene oxide, which copolymers contain more than 50% by weight of isobutylene oxide units, compositions comprising blends of polyisobutylene oxide and polyolefins (olefins of 2–5 carbon atoms) such as polypropylene and polyethylene and compositions of them and other optional conventional additives for molding compositions, such as pigments, etc.

The inventors thus accomplished the process for preparing photolytic polyisobutylene oxide resin molded products of the vanishing type and achieved the present invention. According to the invention, the essential problem of returning practical synthetic high molecular weight substances to dust, by a practical method, after they have been discarded can be solved, which has not heretofore been achieved by those skilled in the art.

Such a useful property of the polyisobutylene oxide resin molded products can be utilized particularly advantageously in disposable products such as packing materials, synthetic papers, throw-away drink containers, tableware and other vessels, wrapping materials, agricultural and horticultural materials, coating materials and disposable fabric products.

Specific examples of such products are packing materials for, for example, perishable foods, processed foods, packing films and bags for sundry goods and packing materials for storage of frozen foods and for sterilization by heat; synthetic paper such as book paper, newsprint, calendar paper and map paper; throw-away drink containers and tableware such as throw-away containers for commercial drinks, for example, wine, beer, milk and acidophilus drinks, general tableware and simple flatware such as those used in hiking. As packing materials for transportaiton, there can be mentioned, for example, foamed packing materials, ropes, containers and transportation cases. As agricultural and horticultural materials, there can be mentioned, for example, agricultural multi-films, bands of automatic rice reaping binders, and insect-control bags for fruits. As coating materials, there can be mentioned, for example, water-proof coating materials for metallic cans and coating materials for protecting commercial goods which materials vanish during use under irradiation of sunlight. As disposable fabric products, there can be mentioned, for example, nonwoven fabrics such as sheets, pillow-covers and shoe polishing cloths; medical fabric materials such as bandages and suturing threads; clothes; and accessory fabric products. Many products other than the above listed ones may be included in the invention.

Photoenergy sources of the photolysis of the polyisobutylene oxide resin molded products include both natural and artificial lights including ultraviolet rays such as sunlight, mercury lamp, carbon arc lamp and xenon lamp. The photolytic velocity can be controlled by changing the quantity of the photoenergy.

As for the conditions under which the polyisobutylene oxide resin molded products are subjected to the photolysis, the photolysis is effected most preferably in air, though the photolytic deterioration reaction can be effected in an inert gas atmosphere or under vacuum. Although the photolysis reaction velocity, decomposition products and proportion of the decomposition products may vary with the presence or absence of water or other impurities, the decomposition/deterioration reaction of the polyisobutylene oxide resin molded products can be carried out essentially in either case. Those conditions can be obtained in fact under natural circumstances such as on the surface of the earth exposed to sunlight including ultraviolet rays. The conditions may also be artificial ones.

BRIEF DESCRIPTION OF THE DRAWING

The drawing is a graph showing the effect of photolysis of a polyisobutylene oxide resin product of the present invention containing the sensitizer caused by photoenergy as compared with those of other photolytic resin products.

In the drawing the vertical measurement is the weight loss of the samples, given in percent, while the horizontal measurement is the ultraviolet ray irradiation time, given in hours. As shown in the drawing there is portrayed the characteristics of the product of Example 1 (the claimed invention), and the characteristics of Comparison Example 1—Samples 3 and 5.

DETAILED DESCRIPTION OF THE INVENTION

The present invention will be further desribed by way of the following illustrative examples, which are not intended to be limiting.

Example 1

In a polymerization vessel filled with nitrogen gas, 100 parts of isobutylene oxide, 0.14 part of water and 0.78 part of t-butylamine were charged. Then, a solution of 3.0 parts of diethylzinc in 20 parts of hexane was charged therein. After carrying out the reaction at 70° C. for 9 hours followed by washing and drying, white powdery polymer was obtained in a yield of 78.2%. The polyisobutylene oxide powder (100 parts) was mixed with 0.9 part by weight of tetrakis [methylene-3-(3,5-di-t-butyl-4-hydroxyphenyl) propionate] methane as antioxidant, 0.1 part by weight of benzyl disulfide and 0.3 part by weight of benzophenone as photosensitizer. From the mixture, pellets were prepared. From the pellets, a sheet of 35 cm. width and 1 mm. thickness was extruded by using a sheet-extruding device composed of a screw-type extruder of 40 mm. diameter, cooling rolls and guide rolls. The extruded sheet was processed with a biaxial film elongating device of TM-Long Co. to obtain a transparent, tough biaxially elongated film of $25\mu$ thickness. The film had a solution reduced viscosity of 2.40 g./dl. at 110° C. in o-dichlorobenzene. The thus obtained, biaxially elongated polyisobutylene oxide film is useful as packing material or the like. The biaxially elongated film was subjected to an outdoor exposure test according to a method described below in Example 2 under conditions described in Example 2. The photolytic property of the film was such that, after 6 months, the film was pulverized or disintegrated into pieces substantially and the weight loss was 23.2 wt. percent.

For evaluating the photolytic property more precisely, test pieces of 10 cm. x 2 cm. of the polyisobutylene oxide sheet (1 mm. thickness) were placed at a distance of 5 cm. from an ultraviolet ray generating device of 200 watt high pressure mercury lamp (a product of Oshina Kogyo Co., Ltd.) and irradiated continuously with ultraviolet rays at 40° C. in an air stream from which carbon dioxide had been removed completely. The vapor phase decomposition products were collected in a trap cooled to −78° C. The stream was introduced into an aqueous solution of barium hydroxide to collect the carbon dioxide generated. After 120 hours' irradiation, the decomposition products were analyzed according to gas mass spectrum, nuclear magnetic resonance absorption, etc. and the results showed that the decomposition products comprised 48.5 wt. percent of acetone, 17.1 wt. percent of formic acid, 11.4 wt. percent of acetic acid and the rest comprised propionic acid, isobutylalcohol, isobutyl aldehyde, carbon dioxide and water.

The results of the determination of continuous weight loss of the extruded sheet irradiated with ultraviolet rays under the same conditions were as shown in the accompanying drawing. The reduced viscosity of the sheets after 10 hours of irradiation was 2.35 g./dl. and their toughness and other mechanical properties remained unchanged. After 40 hours of the irradiation, the viscosity of the sheet was reduced to 0.46 g./dl. and the sheet was broken into pieces or powder readily by touch. Weight reduction started after about 30 hours of the irradiation. After 120 hours, the weight loss per 1 mm. thickness was 22.5 wt. percent. After 700 hours, the solid had vanished substantially completely.

Comparison Example 1

Photolytic properties of the synthetic resins shown in the table given below were tested in the following manner. Pressed sheets of about 1 mm. thickness were prepared from the resins. The samples were irradiated with ultraviolet rays for 120 hours under the same conditions as in Example 1. Samples (2), (3) and (5) were broken by touch, while samples (1), (4) and (6) maintained their toughness. Typical results of the measurement of continuous weight loss were as shown in the accompanying drawing and the following table. From the results, it is apparent that all of the comparative resins are inappropriate as photolytic plastics of the vanishing type.

PHOTOLYTIC PROPERTIES OF VARIOUS RESIN PRODUCTS

| Sample No. | Resin | After 120 hours' irradiation with ultraviolet rays | |
|---|---|---|---|
| | | Mechanical strength | Weight loss (percent) |
| (1) | Polypropylene (trade name—Noblene; a product of Sumitomo Chemical Co., Ltd.). | Tough | 0 |
| (2)* | ___do___ | Brittle, pulverized. | 0 |
| (3) | Polymethyl methacrylate (no additive). | Brittle | 1.2 |
| (4) | Polyacetal (trade name—Duracon; a product of Polyplastics Co., Ltd.). | Tough | 0.3 |
| (5) | Photolytic foamed polystyrene (a product of Biodegradable Plastics Co., U.S.A.). | Brittle, pulverized. | 0 |
| (6) | Foamed polystyrene (a product of Biodegradable Plastics Co., U.S.A.). | Tough | 0 |

*Before the test, the resin was pulverized and subjected to extraction to remove premixed additives.

Comparison Example 2

The polyisobutylene oxide powder of Example 1 was added with the same antioxidant as in Example 1 and then with 0.5 part by weight of 2-(2-hydroxy-5'-methylphenyl benzotriazole as ultraviolet absorber. The mixture was compressed under 100 kg./cm.$^2$ at 190° C. for 10 minutes to obtain a pressed sheet of 1 mm. thickness.

The pressed sheet was exposed to ultraviolet rays under the same conditions as in Example 1. After 120 hours, no weight loss was noted and the sheet was still quite tough, the tensile strength maintenance rate being 94.5%. The pressed sheet was undoubtedly inappropriate as photolytic resin molded products of the vanishing type.

Example 2

A mixture of 80 parts by weight of polyisobutylene oxide powder and 20 parts by weight of polypropylene powder was added with 0.7 part by weight of tetrakis [methylene-3 - (3,5-di-*t*-butyl-4-hydroxyphenyl) propionate] methane and 0.3 part by weight of 4,4'-butylidene-bis(3-methyl-6-*t*-butylphenol) as antioxidants, 0.5 part by weight of p-benzoquinone as sensitizer, 0.2 part by weight of 2-(2'-hydroxy-5'-methylphenyl) benzotriazole as ultraviolet absorber and 0.2 part by weight of ultramarine as pigment. The mixture was roll-blended at 185° C. for 5 minutes, pulverized and then added with 0.7 part by weight of azodicarboxylic amide as foaming agent. From the mixture, foamed dish-shaped products of 3.5 cm. height, 20 cm. diameter and 0.2 cm. thickness were obtained by heating it to 190° C. for 10 minutes. The thus obtained polyisobutylene oxide table wares had satisfactory properties such as about 2.5-fold volume increase by foaming, apparent specific gravity of 0.24, a high strength and a high impact strength. By pouring boiling water into the tablewares, no change in shape or color was caused. The sample was exposed to sunlight in a corrugated board box four sides of which were surrounded and both inside and outside of which were covered with an aluminum foil so that the decomposition products could be evaporated and so that the pulverized sample is not blown away by wind or washed away by rain in the suburbs of Tokyo, Japan (171, Oaza-Tsurugaoka, Iruma-gun, Saitama-ken). After 2 months' exposure, the sample was still stable. After 4 months, the portion of the sample exposed to sunlight was pulverized readily by pushing with a finger. After one year, the weight of the sample including slightly viscous product remaining at the bottom of the box was 43.2 wt. percent based on the original weight. The rest had probably been expelled by evaporation. Separately, a pressed sheet of 1 mm. thickness was prepared from the same resin as that of the disposable tablewares. The sheet was exposed to ultraviolet rays under the same conditions as in Example 1. Weight loss after 120 hours' irradiation was 21.4%. Thus, it is considered that suitable, practical photolytic property is imparted by harmonious combination of the action of the ultraviolet absorber and the effect of the sensitizer.

Example 3

A number of small bottles of 7.5 cm. depth, 2.5 cm. bore, 4 cm. bottom diameter and 0.6 mm. wall thickness were prepared from pellets of an isobutylene oxide copolymer obtained by copolymerization of 100 parts by weight of isobutylene oxide with 9.6 parts by weight of 1-butene oxide unit containing the same antioxidant as in Example 1 and 0.2 part by weight of copper acetylacetone chelate compound as sensitizer, by the blow molding method. The resin was suitable for blow molding because of its excellent mechanical strength, impact strength, low temperature properties and printability. The bottles were useful as throwaway drink containers. The bottles were allowed to stand at the window in a room, but little change in strength or the like was observed.

The bottles were sliced into halves and exposed to the light of a carbon arc lamp by using a weather-ometer at 30° C. After 30 hours' irradiation, no change was observed in the properties such as strength. After 60 hours, a portion exposed to the carbon arc lamp was broken readily by pushing with a finger.

Test pieces of a pressed sheet of 1 mm. thickness prepared from the same resin composition were exposed to the light of mercury lamp under the same conditions as in Example 1. Weight loss after 120 hours was 17.6%.

The embodiments of the invention in which an exclusive property or privilege is claimed are defined as follows:

1. A photolytic polyisobutylene oxide molded product consisting essentially of a major proportion of polyisobutylene oxide resin, and sufficient photosensitizer or photosensitive resin, or both, so that the weight loss of said molded product is in the range of 5 to 50 wt. percent per 1 mm. thickness when irradiated with a 200 watt high pressure mercury lamp at a distance of 5 cm. at 40° C. for 120 hours in air.

2. The product of Claim 1, wherein the photosensitizer is a member of the group consisting of benzophenone, p-benzoquinone, anthraquinone, naphthoquinone, 1,2-benzanthraquinone, o-nitrobenzaldehyde, nitronaphthalene, copper acetylacetone chelate, cobalt acetylacetone chelate, nickel acetylacetone chelate and manganese acetylacetone chelate.

3. The molded product of Claim 1, in which the photo sensitive resin is polyvinylcinnamate or polyvinylcinnamylidene acetate.

4. The molded product of Claim 1, which contains additionally an ultraviolet absorbing agent.

5. The molded product of Claim 2, in which the resin component is a copolymer of isobutylene oxide with alkylene oxide.

6. The molded product of Claim 2, in which the resin component is a mixture of polyisobutylene oxide and polyolefin.

7. The molded product of Claim 2, in which the resin is polyisobutylene oxide, the photosensitizer is about 0.3 part of benzophenone per 100 parts polyisobutylene oxide.

8. The molded product of Claim 4, in which the photosensitizer is about 0.5 part by weight of p-benzoquinone per 100 parts of resin component.

9. The molded product of Claim 5, in which the photosensitizer is about 0.2 part by weight of copper acetylacetone chelate, per 100 parts of resin component.

10. A molded resin product consisting essentially of a blend of polymerized isobutylene oxide, about 0.9 part per 100 by weight of tetrakis [methylene-3-(3,5-di-*t*-butyl-4-hydroxyphenyl)propionate] methane, about 0.1 part per 100 by weight of benzyl disulfide and about 0.3 part per 100 by weight of benzophenone.

11. A molded resin product consisting essentially of a blend of about 80 parts per 100 by weight of polyisobutylene oxide powder, about 20 parts per 100 by weight of polypropylene, about 0.7 part per 100 by weight of tetrakis [methylene-3-(3,5 - di-t-butyl-4-hydroxyphenyl) propionate]methane, about 0.3 part per 100 by weight of 4,4-butylidine-bis(3-methyl-6-t-butylphenol), about 0.5 part per 100 by weight of p-benzoquinone, about 0.2 part per 100 by weight of 2-(2'-hydroxy-5'-methylphenyl)benzotriazole and about 0.2 part per 100 by weight of pigment.

12. A molded resin product consisting essentially of a blend of a copolymer of about 90 parts per 100 by weight of isobutylene oxide with about 9.6 parts per 100 by weight of 1-butene oxide, and about 0.2 part per 100 by weight of copper acetylacetone chelate.

13. The product of Claim 4, in which the ultraviolet absorbing agent is selected from the group consisting of salicylic acid ultraviolet absorbers, substituted benzophenone ultraviolet absorbers and benzotriazole ultraviolet absorbers.

References Cited
UNITED STATES PATENTS 3,454,510   7/1969   Newland et al. __ 260—DIG 43

OTHER REFERENCES

Chemical Abstracts, vol. 68 (1968), 79359j.

MELVYN I. MARQUIS, Primary Examiner

U.S. Cl. X.R.

204—159.14; 260—897, DIG 43